INVENTORS.
GORDON M. COOPER
FREDERICK D. FANNING
BY
Davis, Hoxie, Faithfull & Hapgood
ATTORNEYS.

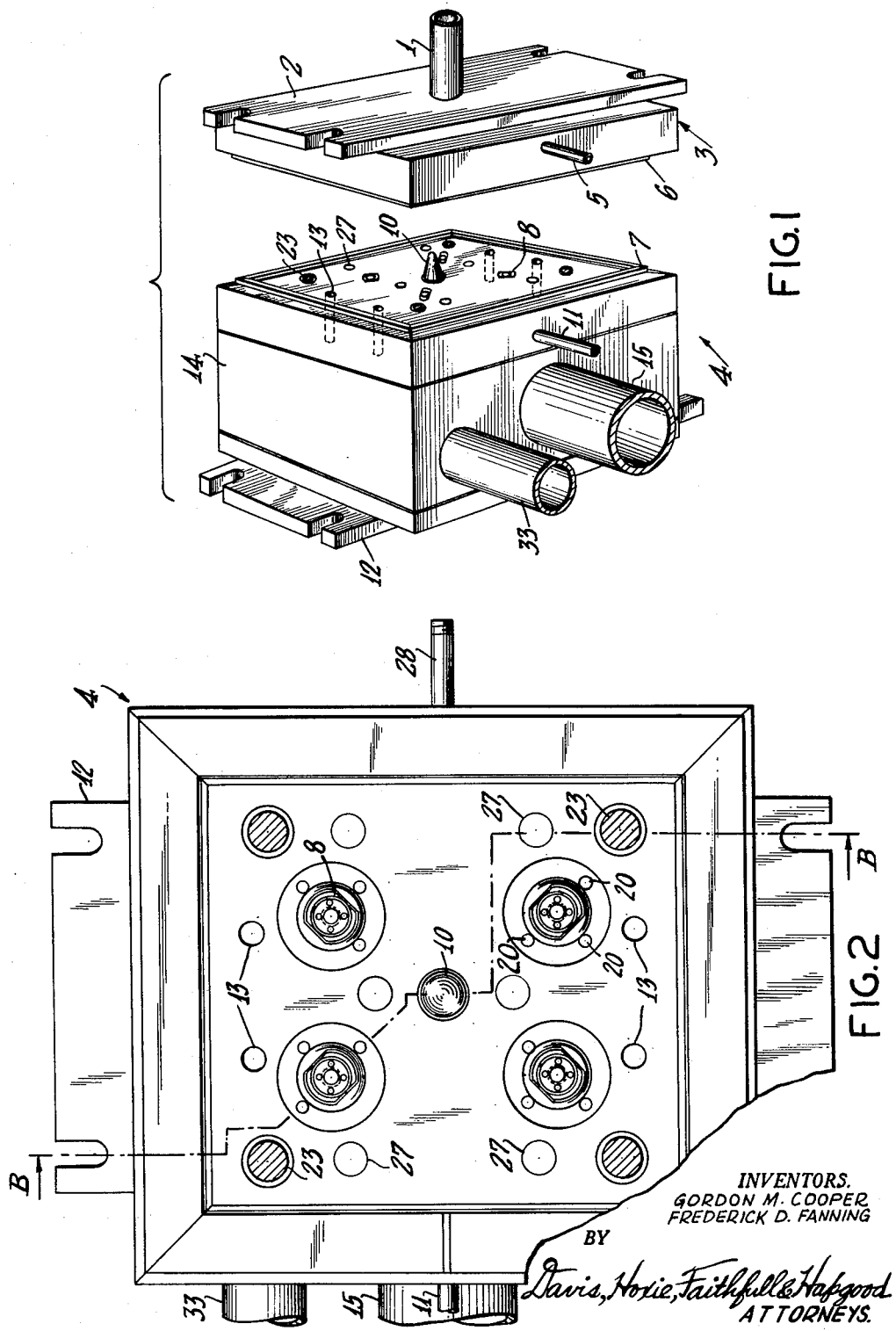

United States Patent Office 3,139,655
Patented July 7, 1964

3,139,655
VACUUM DIE CASTING APPARATUS
Gordon M. Cooper and Frederick D. Fanning, both of North Little Rock, Ark., assignors to The United States Time Corporation, Waterbury, Conn., a corporation of Connecticut
Filed Jan. 4, 1961, Ser. No. 80,629
5 Claims. (Cl. 22—73)

The present invention relates to vacuum molding and more particularly to apparatus and methods for the vacuum molding of small parts.

Vacuum molding of small parts is superior to molding the parts under atmospheric conditions as the parts are consistent in composition, harder, denser, have a finer grain structure, have a smoother surface permitting chrome plating to a jewelry finish, have a thick and dense skin, and are not likely to have voids due to air turbulation.

In one type of vacuum molding apparatus, the vacuum chamber is built in the form of a hood which completely encompasses the molding apparatus. Evacuation of the large hood is time consuming, and the hood is physically cumbersome so that the apparatus is not well suited for the rapid automatic manufacture of small parts. Another type of vacuum molding apparatus has a vacuum plenum on one portion of the two member molding apparatus. The molding process comprises closing the apparatus, pulling a vacuum to evacuate the back chamber through holes from the back chamber to the mold face, and injecting the metal. This apparatus and method have the disadvantage, in the molding of very small parts, that the channels on the face of the mold are so small as to prevent rapid and complete evacuation of those channels and of the mold face thereby causing air turbulence during injection.

In accordance with the present invention a flexible gasket on one of the members of a two-piece molding device permits the device to be partially closed prior to injection of metal. During this partial closure a high vacuum is rapidly pulled in the space between the two members, the evacuation not being limited by the size of the mold's channel members.

It is an objective of this invention that small parts having no voids and high density may be vacuum molded.

It is a further objective that the apparatus may be rapid, automatic and convertible to injection molding under atmospheric conditions. Other features of the invention will be apparent from the following detailed description and the accompanying drawings in which:

FIG. 1 is a perspective view, illustrating in simplified form, the two-piece molding apparatus of the present invention;

FIG. 2 is a top plan view of the mold face of the apparatus of the present invention;

Figure 3:
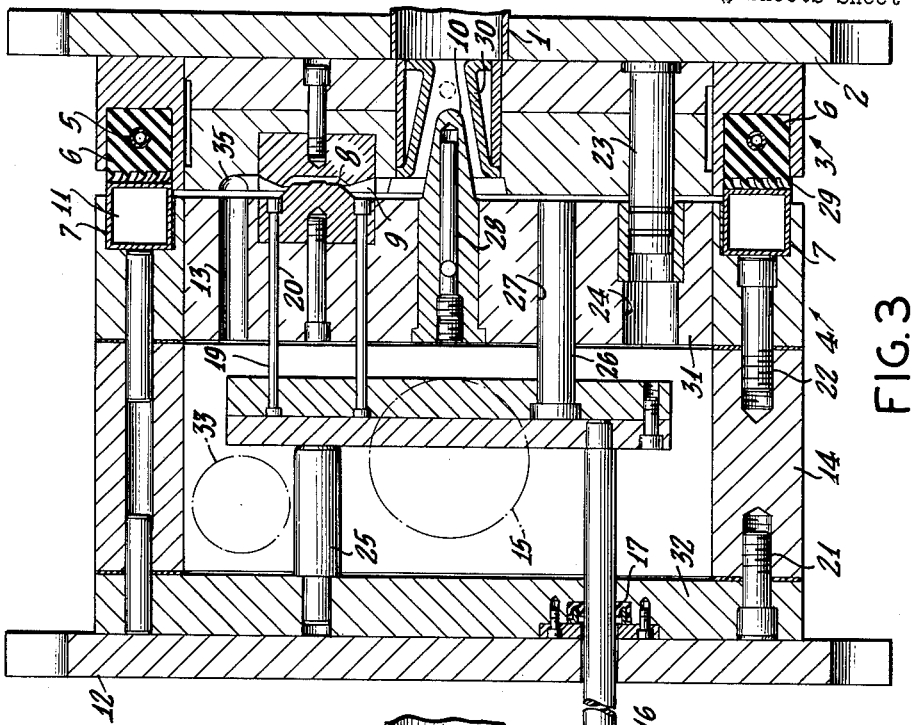
FIG. 3 is a side view of the apparatus of the present invention, taken along lines B—B of FIG. 2 with the two-piece mold in its semi-closed position.

In FIG. 1 the two-piece molding apparatus of the present invention is shown in its open position with air space between the stationary portion of the two-piece molding die (shown generally at 3) and the moving portion of the die (shown generally at 4). The hot liquid metal is injected at the predetermined time when the mold is closed entering through nozzle (sprue bushing) 1. Stationary portion 3 is mounted on backing platen 2 and has on its face channels (runners) 9 through which metal flows to the mold cavities 8. Hollow gasket 6 is securely positioned in a channel on the face of stationary portion 3. Cooling liquid flows within gasket 6, the liquid entering the gasket through cooling pipe 5.

Similarly, on the face of moving portion 4 cooling pipe 11 conducts cooling liquid through sealing member 7 on the face of member 4. The face of member 4 has thereon piece mold cavities 8. The metal entering through nozzle (sprue bushing) 1 flows over cone (sprue puller) 10 and is directed into channels 9. By means of vacuum tube 15 which leads into plenum chamber 14, a vacuum may be pulled within the space between members 3 and 4 during closure of the portions. The vacuum is pulled through vacuum channels 35 in portion 3 which are positioned to connect with vacuum tubes 13 in portion 4. Vacuum line 15 leads to a vacuum accumulator tank (not shown). Air to release the vacuum enters through line 33. Lines 15 and 33 are controlled by solenoid operated valves.

Figure 4:
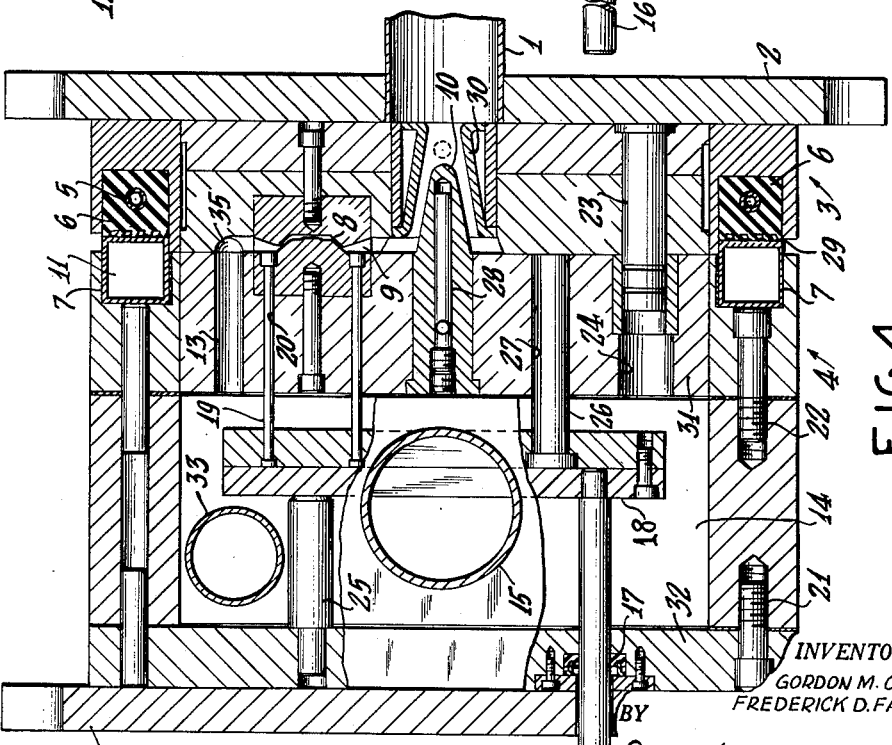
FIG. 4 is the same view as FIG. 3, except that the mold is in its closed position.

In FIGS. 3 and 4 the construction of the injecting member 3 and mold member 4 is shown in greater detail. The nozzle 1 protrudes through backing platen 2 and, by means of annular guide plate 30 (a sprue bushing), directs the molten metal over cone 10 through channels 9 and into mold cavities 8. Cone 10 is cooled by means of cooling pipe 28. As shown in FIGS. 3 and 4, sealing member 7 is a solid metal rectangular hollow tube containing cooling fluid which flows through its rectangular cavity 11. Gasket 6 is hollow, having cooling tube 5 therethrough, and is of heat resistant rubber with flexible sealing fins 29.

Mold portion 4 is guided in its forward and backward motion into contact with mold member 3 by means of guide pin 23 affixed to member 3, which pin slides within guide pin tube 24 in member 4. The molded pieces are ejected from the core plugs of mold cavities 8 after solidifying by ejector pins 19 which are affixed at their bottom portions to knockout plate 18 and slide within ejector pin tubes 20. Knockout pin 26, which slides within knockout pin tube 27, is also affixed to knockout plate 18. Knockout plate 18 is stopped in its rearward movement (away from mold portion 4) by stop member 25 which is joined to the back plate 12. Knockout plate 18 is operated, at a predetermined time, by knockout plate rod 16 which protrudes through the backing plate 12 and is sealed from plenum chamber 14 by rod seal 17.

The box-like structure of mold member 4 is constructed of cold rolled steel and fastened together by bolts 21 and 22. The mold member 4 consists of mold face 31, bottom member 32 secured to backing plate 12, and four side walls. This box-like structure forms plenum chamber 14 which has its egress vacuum line 15.

In operation three time clocks control the cycle of machine movements. In succession a die clamping solenoid is energized (through a die clamping clock) and the dies are closed until the moving mold portion 4 is vacuum sealed against stationary mold member 3. By vacuum seal in this position is meant the open position of FIG. 3 wherein sealing fins 29 of gasket 6 form a seal with sealing member 7, while there is a space of $\frac{3}{32}$ of an inch between the faces of mold portions 3 and 4. This arresting of the forward motion of member 4 is accomplished by de-energizing the clamping solenoid. The vacuum clock is then energized closing the air line solenoids (so that air does not enter through line 33), closing the vacuum shut-off valve at the back of the gooseneck and opening the vacuum solenoid. A high vacuum is pulled, with the mold portions in the semi-open position, of 26 inches of mercury for one-half second. The clamping solenoid is then energized and the portions 3 and 4 are entirely closed with the vacuum still on the die. The shot plunger clock energizes the shot plunger solenoid which releases the shot plunger (not shown) forcing molten metal through nozzle 1. The shot plunger clock then times out. In succession the vacuum clock times out returning the vacuum shut-off valve to its closed position, closing the vacuum line solenoid, opening the atmospheric air line solenoid and returning the shot plunger to its up position. The members 3 and 4 are then separated and the molded parts are ejected by pins 19. The total time for the cycle is six seconds.

We claim:

1. A vacuum molding apparatus comprising a base, a first mold member secured to the base, a second mold member movable relatively toward and from the first mold member, the mold members having matching faces between which faces a mold is defined, a tube connected to one of the mold members for injection of molten metal into the mold, a chamber adjacent to one of said mold members and partially defined by the mold member to which it is adjacent, a vacuum tube from the chamber to the face of the mold member to which the chamber is adjacent, sealing means including a flexible hollow air-tight gasket on one of said mold members which forms a vacuum seal between the mold members when their faces are positioned apart and close together, the hollow of the gasket forming a cooling tube, means to pump cooling liquid through the cooling tube in the gasket, means on the base positioning and holding said mold members in closely spaced relation with each other so that the faces of the molds are separated and the gasket forms a vacuum seal between the gasket and the other mold member, means to create a vacuum in the chamber while the mold members are in such spaced position, and means on the base for thereafter moving said mold members into fixed contact with each other so that their faces touch and form the mold.

2. Molding apparatus according to claim 1, wherein said chamber is adjacent to and partially defined by said movable mold member and said flexible air-tight gasket is on said fixed mold member.

3. Molding apparatus as claimed in claim 2 wherein the gasket has a plurality of flexible sealing fins.

4. Molding apparatus according to claim 2 wherein an air line is connected to the mold face so as to relieve the vacuum.

5. Molding apparatus as claimed in claim 2 wherein the mold comprises a plurality of individual molds connected to the injecting tube by small channels.

References Cited in the file of this patent

UNITED STATES PATENTS

| | | |
|---|---|---|
| 2,448,903 | Miller | Sept. 7, 1948 |
| 2,510,417 | Rehklau | June 6, 1950 |
| 2,799,066 | Federman et al. | July 16, 1957 |
| 2,863,186 | Olson | Dec. 9, 1958 |
| 2,958,104 | Ohse | Nov. 1, 1960 |
| 3,006,043 | Goldhamer | Oct. 31, 1961 |
| 3,009,218 | Rearwin | Nov. 21, 1961 |